United States Patent Office 3,567,819
Patented Mar. 2, 1971

3,567,819
COLD TABLET
Bernard Idson, Leonia, and Michael Stanley Weiss, Paramus, N.J., assignors to Hoffmann-La Roche Inc., Nutley, N.J.
No Drawing. Filed Jan. 30, 1969, Ser. No. 795,351
Int. Cl. A61j 3/10; A61k 9/00, 27/12
U.S. Cl. 424—16                4 Claims

ABSTRACT OF THE DISCLOSURE

Pleasantly flavored, chewable tablets containing aspirin and a decongestant are provided.

DETAILED DESCRIPTION OF THE INVENTION

The present invention is directed to a pharmaceutical preparation which combines an analgesic-antipyretic and a decongestant in a stable form intended for administration to children and those adults who, by necessity or preference, require a chewable tablet. More particularly, the present invention is directed to a chewable tablet containing aspirin (acetylsalicylic acid) as the analgesic-antipyretic and as the decongestant, phenylpropanolamine hydrochloride (2-amino-1-phenyl-1-propanol hydrochloride).

The major problem inherent in all preparations intended for children is that the child will refuse to take medicine because of its bitter or objectable taste. This problem of taste becomes even more formidable in attempts to formulate a chewable tablet as the chewable tablet remains in the mouth of the patient for a longer time than a swallowable tablet. This longer exposure only serves to make the patient more aware of any objectionable taste or "aftertaste" of the preparation. Chewable tablets are highly desirable, however, as many children, and some adults, have difficulty in swallowing a tablet, regardless of its size.

The novel preparations of the present invention combine aspirin and phenylpropanolamine hydrochloride in a stable, palatable form. The tablets as described herein are chewable, have a pleasant taste and are substantially free from the medicinal aftertaste which has been a consistent problem in chewable preparations known in the art.

In addition to the problems of taste and stability inherent in compounding preparations containing aspirin long recognized in the art, the choice of phenylpropanolamine hydrochloride as the decongestant created a problem of chemical incompatibility. Also, the taste of phenylpropanolamine hydrochloride added to that of aspirin produces an extremely bitter product with an unpleasant aftertaste. In order to create a highly palatable, chewable tablet, it was necessary to resolve these problems of taste and incompatibility by a method other than the coating of one or both of the active ingredients which is a common practice in the formulation of preparations presently known in the art as it has been found that coating of phenylpropanolamine hydrochloride is unsuitable for a chewable preparation as the bitter taste of the drug is almost immediately released by chewing.

We have discovered that the above-mentioned problems are effectively resolved by the combination of utilizing unique flavor-masking techniques and the incorporation of the active ingredients into a three-layered tablet as will be hereinafter described. The utilization of three layers effectively negates the problem of chemical incompatibility of aspirin and phenylpropanolamine hydrochloride as each is incorporated in a separate layer of the tablet and these active ingredient-containing layers are separated by a placebo layer.

The problem of the objectionable taste of the phenylpropanolamine hydrochloride is resolved by reacting it with a complex magnesium aluminum silicate compound as, for example, a product known as "Veegum." Veegum is a standard item of commerce and is sold under that trade name by the R. T. Vanderbilt Company, Inc., New York, N.Y. The chemical analysis of Veegum, expressed as oxides, is as follows:

| Oxide | Percent |
|---|---|
| Silicon dioxide | 61.1 |
| Magnesium oxide | 13.7 |
| Aluminum oxide | 9.3 |
| Titanium oxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

A 5 percent by weight aqueous dispersion of Veegum has a viscosity of about 250 centipoises (±25 percent) and a pH of about 9.0. In a more preferred embodiment of the present invention, a micronized form of a complex magnesium aluminum silicate sold as "Veegum F" is employed.

It should be understood that, while the preferred embodiment of the present invention will be described in relation to the use of Veegum-type magnesium aluminum silicates and similar products, other materials can be utilized to adsorb the phenylpropanolamine. For example, resinous adsorbers which will react with primary amines, e.g., cationic exchange resins known in the art as weakly acidic or strongly acidic cationic exchange resins depending on the relative strength of their acid groups. Examples of such resins would include the polyacrylic or polymethacrylic acid resins cross-linked with vinyl aromatic compounds marketed by Rohm and Haas Inc. under such trademarks as "Amberlite IRP-64" and "Amberlite IRP-69." The invention also contemplates the utilization of other similar materials which will absorb primary amines and not adversely affect the characteristics thereof.

The Veegum and phenylpropanolamine hydrochloride are reacted to form a complex by simply mixing the ingredients to be reacted. Thus, for example, where it is desired to obtain a dry granulation, the Veegum and phenylpropanolamine hydrochloride may be mixed in dry form, hydrated with a small quantity of water, dried and pulverized. As an alternative, an aqueous or aqueous-alcohol solution of the phenylpropanolamine may be mixed with the Veegum and treated in a like manner. The complex of the magnesium aluminum silicate and phenylpropanolamine is novel in that such complexes have heretofore has been formed with primary amines. This complex is therapeutically active, stable, substantially tasteless and, most important, devoid of the objectionable bitter aftertaste inherent in preparations formulated with phenylpropanolamine hydrochloride and various sweetening and flavoring agents.

In a preferred embodiment, a tablet is formulated which has the following composition in each layer:

A first layer contains phenylpropanolamine hydrochloride in a tasteless complex as will be described hereinafter and suitable excipient and flavoring agents;

A second layer contains aspirin and therapeutically inert excipient materials;

A third placebo layer which completely separates the above layers and consists of a therapeutically inert excipient and flavoring materials.

We have found that the problem of masking the taste of the aspirin sufficiently to create a highly palatable chewable tablet without significantly increasing the friability of the three-layered tablet is resolved by utilizing a combination of flavors. The most advantageous method of accomplishing this result is the utilization of a small amount of a flavor such as anise, licorice or similar flavor to mask the aspirin taste and a second flavor which gives the ultimate flavor to the finished tablet. Of the flavors commonly known in the art, a fruit flavor such as cherry or wild cherry or a combination of different cherry flavors is preferred. We have found surprisingly that a fruit flavor alone does not mask the aspirin taste effectively. However, when a small amount of the anise-licorice flavor is utilized, the aspirin taste is effectively masked.

The result of utilizing the magnesium aluminum silicate complex of phenylpropanolamine hydrochloride and the above combination of flavors is a stable, chewable tablet having a pure fruit flavor and no unpleasant medicinal aftertaste.

The tablets of the present invention may, in addition, contain fillers and binding agents recognized in the tabletting art such as various polysaccharides, starches, talc and the like as well as artificial sweeteners, preserving agents, coloring agents and the like. The only members of this class of materials which cannot be utilized in formulating the tablets of the present invention are the group of substances which have an adverse effect on the stability of aspirin. These substances, for example, magnesium stearate, hygroscopic salts and the like, must be omitted from the aspirin and placebo layers. This group of substances has long been recognized in the art of compounding. The omission of such substances from the tablet layers as contemplated herein is considered to be well within the knowledge of a person skilled in the art of compounding.

The amounts of the active ingredients of the tablets of the present invention can vary. The preferred amounts are those which are recommended for children, e.g., between from about 0.75 to about 2.0 grs. of aspirin and from about 3.0 mg. to about 15 mg. of phenylpropanolamine hydrochloride. The preferred composition of active ingredients is 1.25 gr. (8.1 mg.) aspirin and 6.25 mg. phenylpropanolamine. It should be noted that tablets containing adult dosage ranges, e.g., up to 5 grains of aspirin and from 25 mg. to 50 mg. of phenylpropanolamine hydrochloride, are within the scope of the present invention. Such tablets are intended for administration to adults who either prefer a chewable tablet or cannot swallow a regular tablet.

Therapeutically, the preparation of the present invention are useful in relieving such symptoms as congestion, headache and fever associated with the common cold, "flu" and other conditions where the combined therapy of aspirin plus a decongestant would be indicated. Such therapeutic situations are well known to the clinician.

For a fuller understanding of the nature and objects of this invention, reference may be had to the following example which is given merely as an illustration of the preferred embodiment of the invention and is not to be construed in a limiting sense. All parts given are parts by weight unless otherwise indicated.

EXAMPLE

One thousand tri-layered chewable tablets are prepared as follows:

Layer 1

6.31 grams of phenylpropanolamine hydrochloride were dissolved with gentle heat (45–50° C.) in a mixture of 24.0 ml. isopropyl alcohol and 6.0 ml. distilled water. After solution was attained, 0.30 ml. of blended fruit liquid flavoring were blended into the solution. 35.0 grams of Veegum F were added to the solution, mixed in a suitable mixer and dried on paper-lined trays for two hours at 43° C. The resulting granules of phenylpropanolamine adsorbed on Veegum F were then mixed in a suitable mixer for 10 minutes at medium speed with 67.9 grams of an excipient mixture consisting of sucrose, mannitol and artificial sweeteners, 13.0 grams of pregelatinized cornstarch, 6.0 grams of starch (corn) and 0.22 gram FD and C Red No. 3 Lake. The mixture was then passed through a Fitzpatrick Comminuting Machine utilizing a No. 1 screen, knives forward. The resulting granules were placed in a suitable mixer and granulated with distilled water until they became suitably wet. The wet granules were then placed on paper-lined trays and dried overnight at 43° C. The resulting dry granules were mixed with 2.0 grams talc, 4.0 grams fully hydrogenated cottonseed oil and about 14.0 grams spray-dried fruit flavors and passed through a Fitzpatrick Comminuting Machine at medium speed utilizing a No. 1B screen. The resulting granules were blended in a suitable mixer until homogeneous. The granules were stored in polyethylene bags until the tablets were compressed.

Layer 2

24.0 grams of confectionary grade sucrose, 5.0 grams of pregelatinized cornstarch, 40.5 grams of mannitol and 7.0 grams of starch (corn) were combined in a mixer and wet granulated with distilled water. The wet granules were passed through a Fitzpatrick Comminuting Machine, running at medium speed and utilizing a No. 6 screen, knives forward. The granules were then dried on paper-lined trays at 43° C. for 12 hours. The dry granules were combined with 2.0 grams fully hydrogenated cottonseed oil and a sufficient amount of powdered anise flavor and passed through a Fitzpatrick Comminuting Machine, running at medium speed, utilizing a No. 1B screen with knives forward. The resultant granules were blended in a suitable mixer until homogeneous and stored in polyethylene bags until the tablets were compressed.

Layer 3

81.0 grams of aspirin as an aspirin-cornstarch granulation and 10.0 grams talc were blended in a suitable blender until homogeneous. The resultant granules were stored in polyethylene bags until the tablets were compressed.

Formation of tablets

A Manesty Layer Press equipped with $11/32''$ flat faced beveled edge punches was utilized to form the layers which were in turn compressed to form the finished tablets. The approximate weight of a single tablet is 343 mg. being made up of 150 mg. of layer 1, 80 mg. of layer 2 and 113 mg. of layer 3. The finished tablets contain approximately 1.25 gr. (81 mg.) aspirin and 6.25 mg. phenylpropanolamine hydrochloride.

We claim:
1. A stable, chewable, pleasant tasting therapeutic tablet comprising:
   (a) a first therapeutic layer consisting essentially of acetyl salicylic acid and therapeutically inert excipient materials free of adverse affect on the stability of the acetyl-salicylic acid;
   (b) a second therapeutic layer comprising a substantially tasteless phenylpropanolamine hydrochloride magnesium aluminum silicate or cationic exchange resin complex or adsorbate and therapeutically inert excipient materials, said complex being devoid of the objectionable, bitter, inherent aftertaste of the phenylpropanolamine when chewed; and
   (c) a placebo layer comprising therapeutically inert, pharmaceutically acceptable sucrose, mannitol, pregelatinized corn starch and starch excipients for binding and an effective amount of anise-licorice flavoring materials to mask the bitter taste of the acetyl-salicylic acid wherein said placebo layer completely separates said first therapeutic layer from said second therapeutic layer.

2. The chewable therapeutic tablet according to claim 1 wherein said first therapeutic layer contains from about 0.75 grain to about 5.0 grains of acetylsalicylic acid and said second therapeutic layer contains from about 5.0 mg. to about 50.0 mg. of phenylpropanolamine hydrochloride.

3. The chewable tablet according to claim 1 wherein said first therapeutic layer contains about 1.25 grains of acetylsalicylic acid and said second therapeutic layer contains 6.25 mg. phenylpropanolamine hydrochloride.

4. The chewable tablet according to claim 1 wherein said phenylpropanolamine hydrochloride adsorbate comprises a complex of phenylpropanolamine hydrochloride and a magnesium aluminum silicate.

References Cited

UNITED STATES PATENTS

| | | | |
|---|---|---|---|
| 3,048,526 | 8/1962 | Boswell | 424—21 |
| 3,070,508 | 12/1962 | Siegel et al. | 424—79 |
| 3,085,942 | 4/1963 | Magid et al. | 424—258 |
| 3,131,121 | 4/1964 | Gans | 424—79 |
| 3,140,978 | 7/1964 | Zentner | 424—260 |
| 3,143,465 | 8/1964 | Keating | 424—79 |
| 3,248,290 | 4/1966 | Zentner | 424—258 |
| 3,337,402 | 8/1967 | Zentner | 424—184 |
| 3,337,403 | 8/1967 | Zentner | 424—184 |
| 3,341,415 | 9/1967 | Scott | 424—361X |
| 3,432,593 | 3/1969 | Shepard | 424—20 |

OTHER REFERENCES

"Ursinus" Inlay-Tab, T.M. 699,324, Reg. June 14, 1960, Dorsey Labs, div. Wander Co.

SHEP K. ROSE, Primary Examiner

U.S. Cl. X.R.

424—23, 79, 154, 155, 230, 233, 330, 357